Aug. 15, 1950 J. M. KUHLIK 2,519,318

SOUND RECORDING AND REPRODUCING APPARATUS

Filed Dec. 24, 1946 4 Sheets-Sheet 1

INVENTOR.
JACOB M. KUHLIK

BY
Edw. S. Higgins
Attorney

Aug. 15, 1950 J. M. KUHLIK 2,519,318

SOUND RECORDING AND REPRODUCING APPARATUS

Filed Dec. 24, 1946 4 Sheets-Sheet 2

INVENTOR.
JACOB M. KUHLIK
BY
Edw. S. Higgins
Attorney

Aug. 15, 1950 J. M. KUHLIK 2,519,318

SOUND RECORDING AND REPRODUCING APPARATUS

Filed Dec. 24, 1946 4 Sheets-Sheet 3

INVENTOR.

BY JACOB M. KUHLIK

Edw. S. Higgins
Attorney

Aug. 15, 1950

J. M. KUHLIK 2,519,318

SOUND RECORDING AND REPRODUCING APPARATUS

Filed Dec. 24, 1946

4 Sheets-Sheet 4

INVENTOR.
JACOB M. KUHLIK
BY
Edw. S. Higgins
Attorney

Patented Aug. 15, 1950 2,519,318

UNITED STATES PATENT OFFICE 2,519,318

SOUND RECORDING AND REPRODUCING APPARATUS

Jacob M. Kuhlik, Sea Gate, N. Y., assignor to Hattie B. Kuhlik, Sea Gate, N. Y.

Application December 24, 1946, Serial No. 718,221

1 Claim. (Cl. 274—11)

This invention relates generally to the art of recording and reproducing sound.

A primary object of my invention is to provide apparatus for recording and reproducing sound with means for automatically positioning the parts of the apparatus for recording.

Another object of the invention is to provide such apparatus with means for positioning the parts for recording actuated by the voice or other sound whereby such sound will be recorded automatically without manual intervention.

Still another object is to provide such apparatus with means for automatically starting the apparatus by voice or other sound and for automatically stopping the apparatus.

Yet another object is to provide such apparatus with a single sound box and stylus for recording and reproducing with improved means for conditioning said sound box and stylus for recording and reproducing.

A further object is to provide such apparatus with means for combining same with a telephone whereby a conversation over said telephone will be automatically recorded and reproduced by the apparatus.

Another object is to provide such apparatus with improved means for driving the film.

Another object is to provide such apparatus with improved means for visibly indicating the position of the stylus transversely of the film when recording.

Another object is to provide such apparatus with improved means for indicating the location of the stylus longitudinally of the film.

Another object is to provide improved means for readily rewinding the film.

Another object is to provide improved means for positioning the stylus on any desired track on the film.

Another object is to provide improved means for audibly indicating the approaching end of the forward movement of the film.

Another object is to provide improved means for automatically stopping the rewinding movement of the film.

The foregoing and other objects and advantages of my invention will be better understood from the description thereof to follow taken in connection with the accompanying drawings in which—

Figure 1:
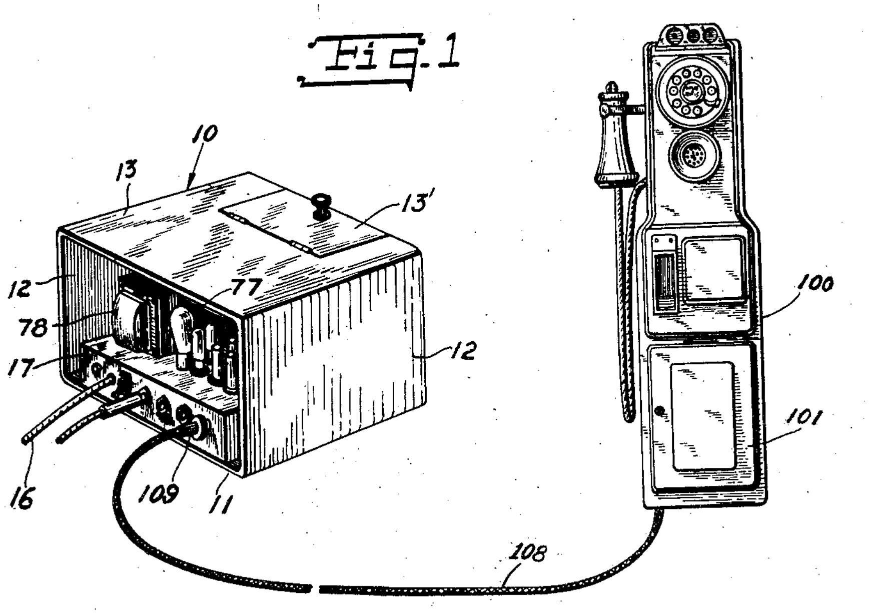
Fig. 1 is a perspective view of the apparatus for recording and reproducing sound embodying the invention combined with a wall type telephone.

The improved apparatus may be housed in a cabinet or casing 10 having a bottom wall 11, side walls 12, top wall 13. The rear of the casing is open and its front has a wall 14 closing the upper part of the casing. Wall 14 is provided with an elongated opening 15. A hinged cover 13' may be provided in the top wall to permit inspection of the inside of the casing.

The apparatus is electrically operated and is adapted to be connected to a source of electrical power such as the house supply by means of a conductor 16. The apparatus includes a chassis 17 supported on the bottom wall at its rear. Secured to the chassis by means of side bars 18 and supported by the bottom wall 11 is a vertically disposed supporting wall 19 which supports the various mechanisms of the apparatus. Supported by the wall 19 forwardly thereof and in spaced relation thereto by means of posts 20 is a panel or instrument board 21, said panel extending from the top of wall 19 downwardly to a point above the center line thereof. This panel when in position closes the opening 15 of the cabinet and is exposed therethrough.

Rotatably supported in the wall 19 at one side thereof is a spindle 22 and similarly mounted on the other side is a spindle 23. Detachably mounted on the outer end of shaft 22 is a supply reel 24 and similarly mounted on shaft 23 is a receiving or take-up reel 25. A record 26 formed of a strip of film-like material such as acetate which is capable of having formed thereon a groove by an embossing stylus or cutting stylus is carried by the supply reel and is adapted to be taken up by the receiving reel.

A motor 27 for driving the strip of film is mounted on a bracket 28 supported on the wall 19 at its top and extending rearwardly thereof. The motor may be flexibly supported by rubber blocks 29 on the bracket so that it can be swung bodily about its axis. Rotatably mounted in the center of the wall and protruding rearwardly and forwardly thereof is a drive shaft 30. Fastened on the inner or rear end of said shaft is a disc wheel or drum 31, the periphery of which is normally in frictional engagement with the shaft 32 of the motor. On the outer end of the shaft 30 is a drive wheel or drum 33, the peripheral surface of which is preferably formed of rubber. On a stub shaft 34 rotatably supported by the wall and positioned parallel and adjacent to shaft 30 is fastenend a crank arm 35. The free end of the arm carries a forwardly projecting stud 36 and mounted on the outer end of said stud is a friction wheel 37 adapted to be moved into and out of contact with the periphery of the drive wheel 33. A spring 38 having one end fixed to the inner end of shaft 34 and its other end to a stud 39 fixed on the inside of wall 19 urges the friction wheel 37 into contact with the drive wheel 33.

The apparatus herein described is of the type which embraces a laterally undulating groove of constant depth on the record 26. A stylus 40 is mounted at an acute angle with the approaching record in a stylus head or sound box 41 which may be of any standard design suitable for receiving an electric current with alternations of an amplitude and frequency varying in accordance with the amplitude and frequency of sound waves and causing a mechanical lateral vibration of the stylus of an amplitude and frequency corresponding to the amplitude and frequency of the current alternations, and, vice versa, receiving the laterally undulating vibrations of the stylus and electromagnetically generating an electric current in conductors leading from the stylus head having alternations of amplitude and frequency corresponding to those of the stylus. The stylus head is connected to an ordinary audio frequency amplifier mounted in the chassis 17.

The apparatus employs the stylus 40 and the stylus head 41 both for recording and for reproducing sound. So that the stylus head may be capable of both of these functions it must be so mounted upon its shaft 41′ that its relationship to the shaft may be alternately adjustable to either one of two conditions, a condition for recording in which the head is rigidly related to the shaft as respects motion in planes parallel to the record and is pressed relatively firmly toward the record in planes perpendicular thereto, and another condition suitable for reproducing in which the head is free to move relative to the shaft in planes parallel to the record, so that the stylus may be free to follow the lateral undulations of the record without deforming its side walls and in which at the same time it is pressed toward the record in planes normal thereto with a relative light pressure to avoid such a deepening of the groove as will both ultimately cut through the record and will laterally restrain the needle so that it cannot follow the undulations of the grooves but will rather deform them.

The shaft 41′ mounting the stylus head 41 is slidably and rotatably supported by the wall 19 and panel 21. The shaft is screw threaded as indicated at 42 for approximately half its length at its rear and this threaded portion extends through an internal screw threaded bushing 43 supported in the wall 19. The stylus head is fastened to a casting 44 which is provided with a sleeve 44′ which is hingedly mounted on the shaft whereby said head may be moved up and down whereby its stylus 40 is moved off and on to the record 26. The sleeve is disposed between two washers 46 fixed to the shaft 41′ whereby the sleeve and head are carried along with the shaft. Supported on the inner surface of the wall 19 is a casting or block or plate member 47. This block has an opening 48 through which the shaft 41′ extends rearwardly. The block is formed with a recess 49 which communicates with the opening 48 and mounted in said recess is a pin or stud 50. A spring 51 mounted in the recess to the rear of the pin urges said pin into engagement with the threads of the shaft 41′ so that when said shaft is rotated by means of a knob 52 on its outer end, the shaft will slide longitudinally carrying the stylus head along with it. A nut or plug 53 in the outer end of the recess retains the spring and adjusts its tension. On the inner end of the shaft 41′ is a cylindrical member 54 and secured to the inner face of said member is a toothed disk 55. Coacting with this toothed disk is an arm 56 pivotally supported by a bracket 57 at the rear of wall 19. A pin 58 carried by the arm is adapted to drop in between the teeth of the disk to hold the shaft 41′ against accidental rotation. Rotation of the shaft will move the pin out of the grooves between the teeth against the action of a spring 59 having one end connected to the arm 56 and its other end to a lug 60 on the wall.

Supported by the wall 19 and extending forwardly thereof below and to one side of the shaft 41′ is a base or anvil 61. The record 26 when the apparatus is recording or reproducing passes from the feeding reel 24 upwardly over the base 61 and then downwardly around the drive wheel 33 and between the drive wheel 33 and friction wheel 37 and thence to the take-up reel 25. The record when passing over the base is adapted to be engaged by the stylus 40 for recording and reproducing when the stylus head 41 is in its lowermost position.

For rewinding the record, a motor 62 is flexibly supported on a bracket 63 fixed to the rear of the wall 19 and to one side thereof. This motor is adapted to be moved bodily about its axis. On the inner end of the rotatable spindle 22 supporting the feeding reel is a disk wheel 64. The motor 62 is so positioned that its shaft 65 ordinarily is out of engagement with said disk wheel but may be moved so as to frictionally engage the wheel for rotating the spindle 22 in a backward direction for rewinding the record on the feeding reel 24.

The mechanism for indicating the position of the stylus longitudinally of the record includes, in addition to the motor 27, motor shaft 32 and driven shaft 30, a disc 66, having a peripheral groove, mounted on the inner end of shaft 30 adjacent drum 31. A similar disc 67 but smaller is mounted on the inner end of spindle 23. A flexible belt 68 carries the drive from the disc 66 to the disc 67. A flexible drive belt 69 has one end connected to the inner end of the spindle 23 and its other end is operatively connected to a meter or counting device 70 mounted on the inside of the panel whereby the counter is actuated by the shaft 30 to register the footage. The record 26 is suitably marked at spaced intervals therealong with identification marks, for indicating the various zones or spaces therealong. For instance, it may be marked at every foot of its length with a number, starting at one end thereof with the number "1" and numbering the spaces consecutively up to, for instance, "500" if the film is that long. Other identification marks may be used of course, such as, the letters of the alphabet. The counting device will of course be preset to correspond with the correct mark on the record so that the mark or number, for instance, as it passes under the stylus will be registered on the counting device. A window 71 is formed in the panel 21 for viewing the counting device in order to give the operator a chance to see what particular section or zone of the record is being operated upon by the stylus. This greatly facilitates the reproducing of the recorded matter on any particular zone or section desired.

It is often desirable to indicate the position of the stylus on the record transversely thereof. For this purpose I provide a toothed disc 72 mounted on the inner surface of the panel 21. This wheel is in mesh with a gear 73 on the shaft 41' just inside the panel so that as the shaft 41' is rotated its movement is imparted to the disc 72. Fixed on the surface of disc 72 is a scale 74 bearing numbers, for example, from "0" to "100" to indicate the number of grooves or tracks from edge to edge of the record. The numbers may be read through a window 75 in the panel 21 and the window is formed with a pointer 75' which points to the number of the track on which the stylus is working. If the head and stylus are moved to track 4, for example, by knob 52, the disc wheel and scale will be moved so that the number "4" will be in line with the pointer 75'.

The stylus head is connected to the usual amplifier circuits to permit of recording and reproduction. Such circuits do not constitute an essential part of my invention and since they are well known and understood by those skilled in the art they are only shown diagrammatically at 76 in Fig. 8. The amplifier includes the usual tubes including a control tube 77 associated with a transformer 78, all mounted on the chassis 17.

Control of the circuits to the stylus head is through a multiple contact switch 80 comprising a frame 81 mounted on a bracket 82 supported by the wall 19. The switch has stationary contacts 83, 84, 85 and 86, and a movable contact 87 carried by a rotatable actuating shaft 88 extending between the wall 19 and panel 21. A pointed knob or handle 89 on the outer end of the shaft 88 serves to actuate the shaft and move the contact 87 into contact with either of the stationary contacts. On the panel 21 adjacent the knob 89 and arranged in arcuate fashion therearound are the symbols "R," "P," "N" and "REW." When the movable contact 87 is moved by the knob 89 into contact with stationary contact 83 and the stylus is in engagement with the record, the microphone or other device is connected through the amplifier to the stylus head for recording, and the knob 89 will point to "R."

When the movable contact 87 is moved into contact with contact 84, the stylus being in engagement with the record, the amplifier is connected to the loud speaker or other device for "play back" or reproducing the recorded sound and the knob will point to "P."

When the movable contact is moved into contact with contact 85 and the knob points to "N," the amplifier is cut out of circuit and the parts are in neutral position and no recording or play back takes place.

When the movable contact is moved into contact with the contact 86 and the knob points to "REW," the circuit is closed through the rewind motor 62 for rewinding the record and the amplifier is cut out of circuit.

The control means for starting the motor 27 for driving the record film forwardly for recording includes a switching device 90 mounted on the inside of the panel 21. This switch has stationary contacts 91, 92 and 93 and a movable contact 94 mounted on the end of an actuating control shaft 95 which extends through the panel to the exterior thereof. A pointed knob or handle 96 is fastened to the outer end of the shaft for actuating the same. The panel 21 adjacent the knob 96 bears the symbols "Off" "Voice" and "On."

When the movable contact 94 is moved into contact with contact 93 and the knob 96 points to "On," the motor 27 will be connected to drive the strip of film forwardly from reel 24 to reel 25.

When the movable contact is moved into contact with the stationary contact 91 and the knob points to "Off" the motor 27 is cut out of circuit and becomes inoperative.

The mechanism as it has thus far been described is to be controlled manually. However I have provided mechanism for having the apparatus start automatically to transcribe or record when sound occurs and to cease transcribing or recording when there is no sound. This is accomplished by providing a single pole single throw relay device 97 mounted on the chassis 17 and arranged and connected with the control tube 77 of the amplifier and with the motor 27. This relay device is also electrically connected with contact 92 of switch 90. If it is desired to start the apparatus automatically, that is to say so that it will be responsive to the voice or sound, the movable switch member 94 of switch 90 is moved by knob 96 and shaft 95 into contact with stationary contact 92. This sets the elements for automatic operation so that when a sound occurs and it is picked up by a suitable device and passed through the amplifier system and is impressed upon the control tube 77 the coil of the relay device 97 will become energized and its armature 98 will drop to close the circuit through the motor 27 to start said motor for driving the record film 26 forwardly. The sound may be picked up by a microphone as shown diagrammatically at 99 in Fig. 8 or by a telephone 100 as shown in Fig. 1. The armature 98 is actuated through the coil of the relay device and the coil is energized through sound waves impressed upon the control tube 77 which may be an ordinary thyratron tube or a standard three-element vacuum tube. When the coil becomes energized its armature drops and contacts a contact 97' which is in circuit with the motor 27 thereby closing the circuit through said motor. When the sound waves are no longer impressed upon the tube 77, the coil becomes deenergized and the armature is released. A condenser 98' placed across the coil of the relay device provides a lag in the deenergization of the coil. In order to carry the sound waves to the tube 77, a microphone or telephone is connected through the amplifier circuit indicated diagrammatically at 76 in Fig. 8.

The telephone as shown in Fig. 1 is of the wall type and is provided with the usual bell box 101 containing a polarized ringer 102 of any well known type provided with gongs 103. An induction coil 104 is mounted in the box above and adjacent the ringer and above the coil is the usual strip 105 for supporting the terminals 106, all of which elements are connected to conductors as is customary as well as the ringer 102 so that said ringer will be actuated by currents impressed upon said conductors. These electrical connections are well known and are not shown.

When the movable contact 94 of switch 90 is in contact with stationary contact 92 thereof, the apparatus is set to record any sound which reaches the microphone or telephone, and the record film will only be consumed during the time that sound is impressed upon said microphone or telephone. If the apparatus is to be used as an ordinary dictating machine using a microphone, when the dictator ceases dictation the machine automatically discontinues the use of the film. On the other hand, when the dictator starts to dictate again the apparatus begins to function.

When a telephone is used, an induction coil 107 is suitably positioned in contacting relation with the induction coil 104 of the telephone and the induced currents are brought from the coil 107 through a conductor 108 and jack or plug device 109 to the amplifier circuit of the apparatus.

When the ringer 102 is energized and the gongs 103 sounded, the sound of the gongs will be impressed upon the control tube 77, the relay device 97 will become energized pulling down its armature 98 to close the circuit through the motor 27 thereby starting the motor for driving the record 26 for recording, the stylus having previously been set in operative position on the record. The telephone conversation will be carried over conductor 108 through the amplifier circuit, the stylus head and stylus on to the record film 26 for recording. When the conversation stops the coil of the relay device 97 becomes deenergized and the motor 27 will stop, slight interruptions in the conversation being taken care of by the condenser 98'.

Figures 2, 3:
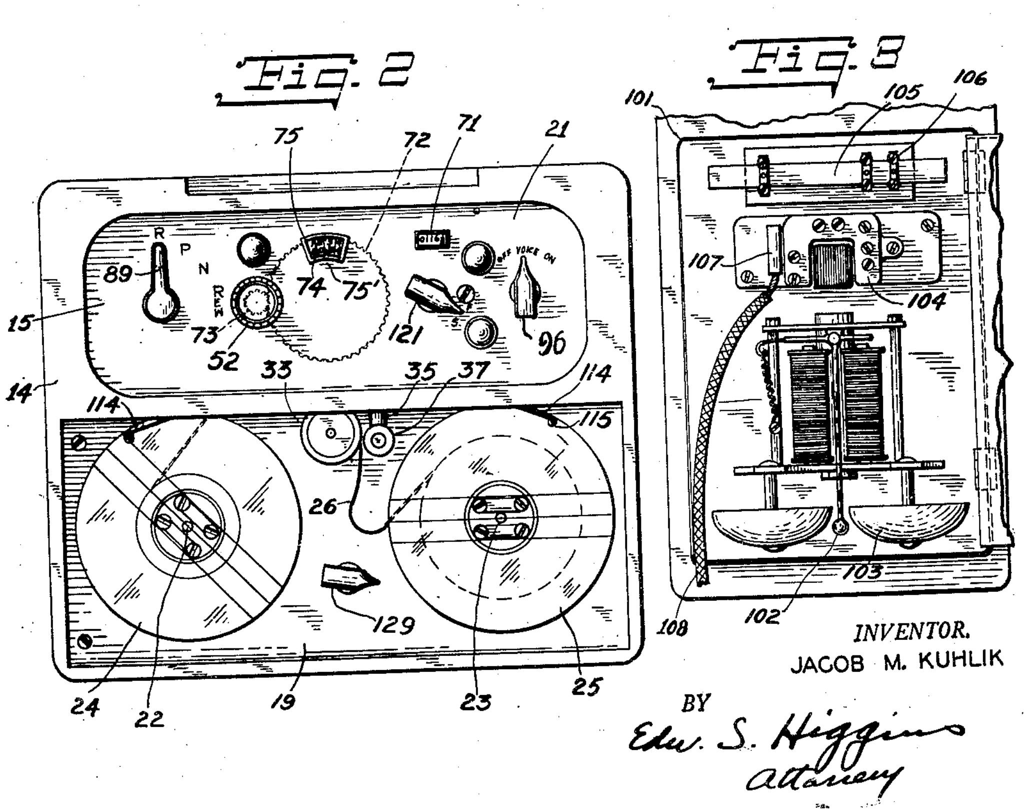
Fig. 2 is a front view of the recording and reproducing apparatus.
Fig. 3 is an enlarged front view of the bell box of the telephone of Fig. 1 with the cover removed.
Figure 9:
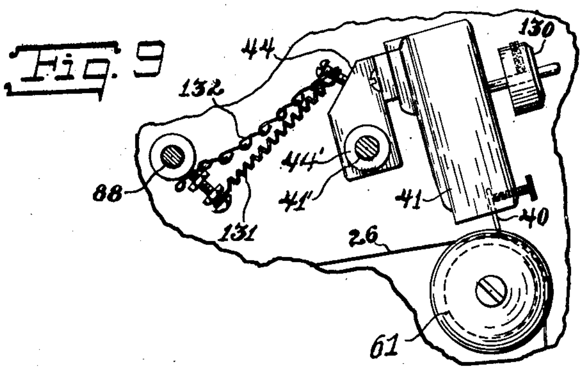
Fig. 9 is an enlarged side view of the sound box and associated parts.
Figure 10:
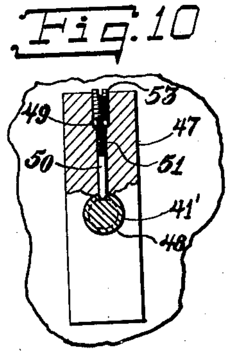
Fig. 10 is an enlarged partial elevational and sectional view of the mechanism for causing rotation of the shaft which carries the sound box.
Figure 4:
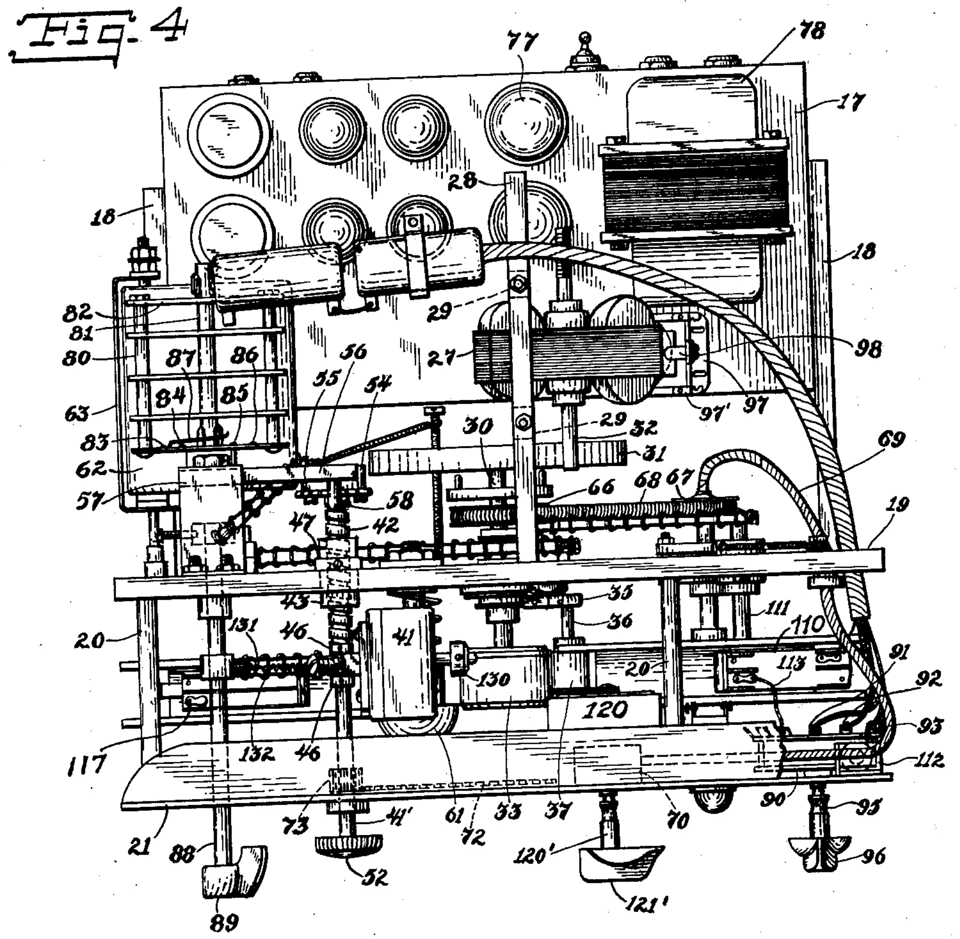
Fig. 4 is an enlarged top plan view of the recording and reproducing apparatus.
Figure 5:
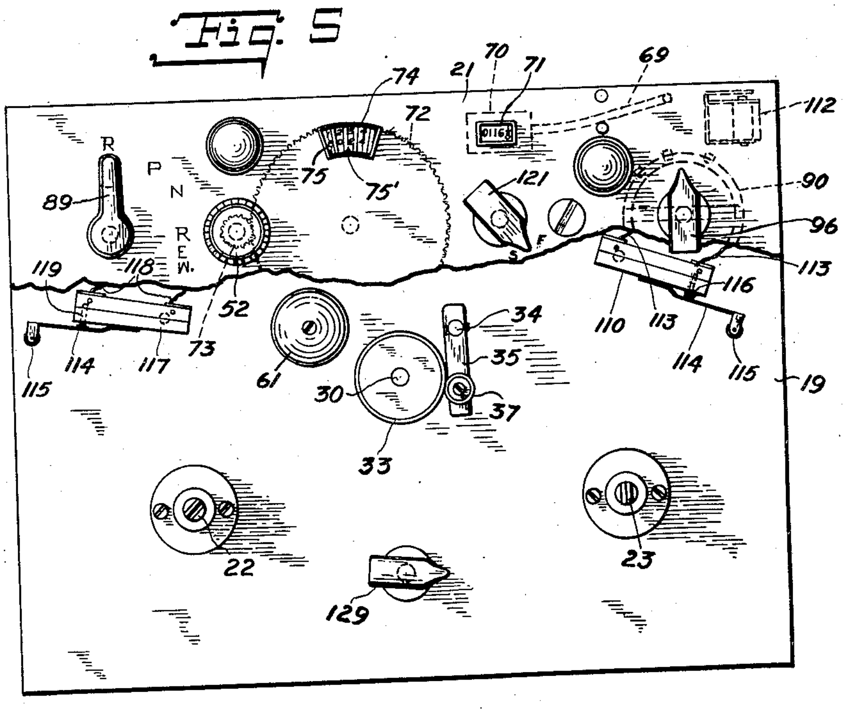
Fig. 5 is an enlarged front view of the supporting plate and panel with the various parts mounted thereon, part of the panel being broken away, and parts being missing.
Figure 6:
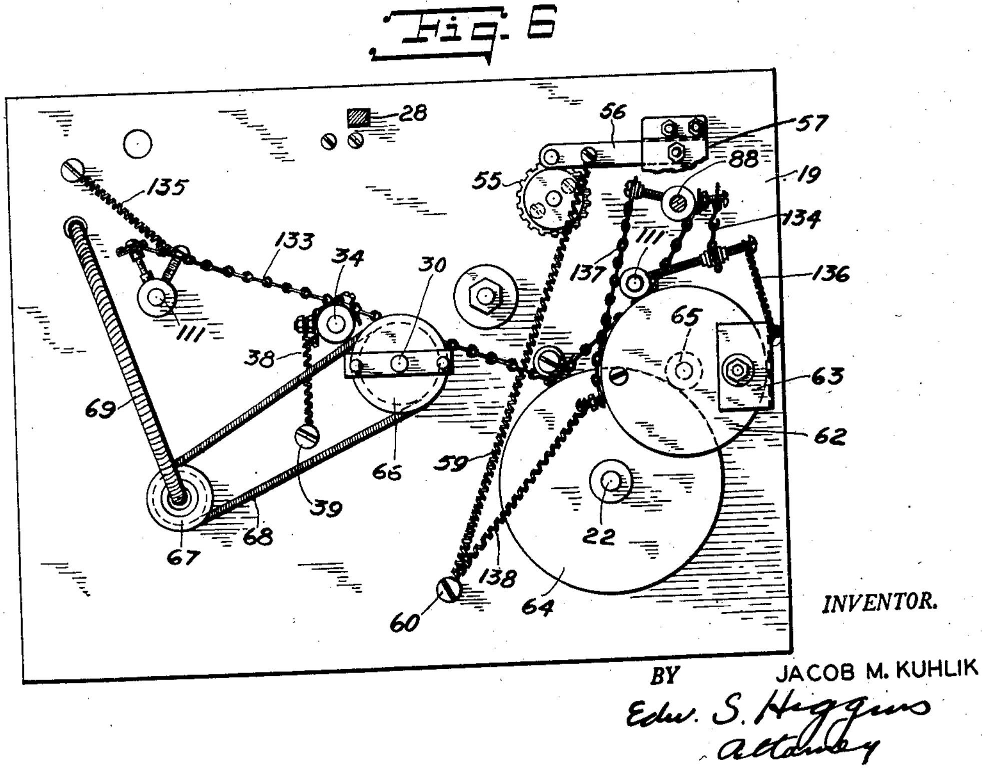
Fig. 6 is an enlarged rear view of the supporting plate with various parts mounted thereon.
Figure 7:
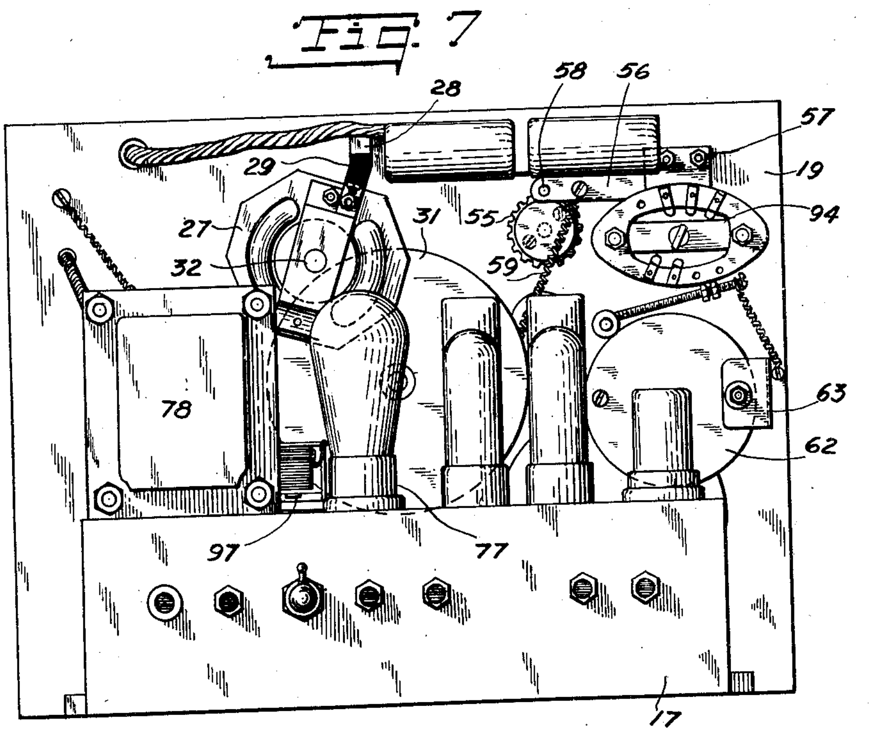
Fig. 7 is an enlarged rear view of the sound recording and reproducing apparatus.

I also provide mechanism for indicating when the forward run or feeding motion of the record film 26 is reaching the end of its forward run on to take-up reel 25. This mechanism includes a switching device 110 mounted on a rotatable shaft 111 supported by the wall 19. A buzzer device 112 is supported on the inner surface of the panel 21 and is in circuit with said switch 110 through conductors 113. The switch includes movable and stationary contacts (not shown) and also includes a movable switch member in the form of a spring arm 114 carrying a roller 115 and a plunger 116. The movable and stationary contacts are normally separated, and the plunger is positioned to engage the movable contact. The switch is arranged and positioned so that its roller 115 is disposed just within the outer periphery of the spaced walls of the reel 25 as shown in Fig. 2. When said take-up reel 25 is approximately filled with coils of the record film, the outermost coil will engage the roller 115 and move arm 114 into contact with the plunger thereby moving said plunger against the movable contact whereby said movable contact contacts the stationary contact closing the circuit through the buzzer 112 which will sound and warn the operator that the film is nearing the end of its forward run so that the apparatus can be stopped manually.

Mechanism is also provided for automatically stopping the rewind motor 62 at the end of the rewind run of the film. This includes a switch 117 similar to switch 110 and similarly arranged and positioned near feed reel 24 so that the outermost coil of the rewound film will engage the roller 115 and move the arm 114 of switch 117 into contact with plunger 119 of said switch. The movable and stationary contacts of switch 117 are connected to motor 62 by conductors 118 and said contacts are normally in contact with each other, but are adapted to be separated by plunger 119 to break the circuit through the motor 62 and stop the same.

The speed of motor 27 may be controlled by a rheostat 120 mounted on the panel 21 and connected to the motor 27 by a conductor 121. The rheostat is actuated by a shaft 120' extending outwardly of the panel and provided with a knob 121'.

Figure 8:
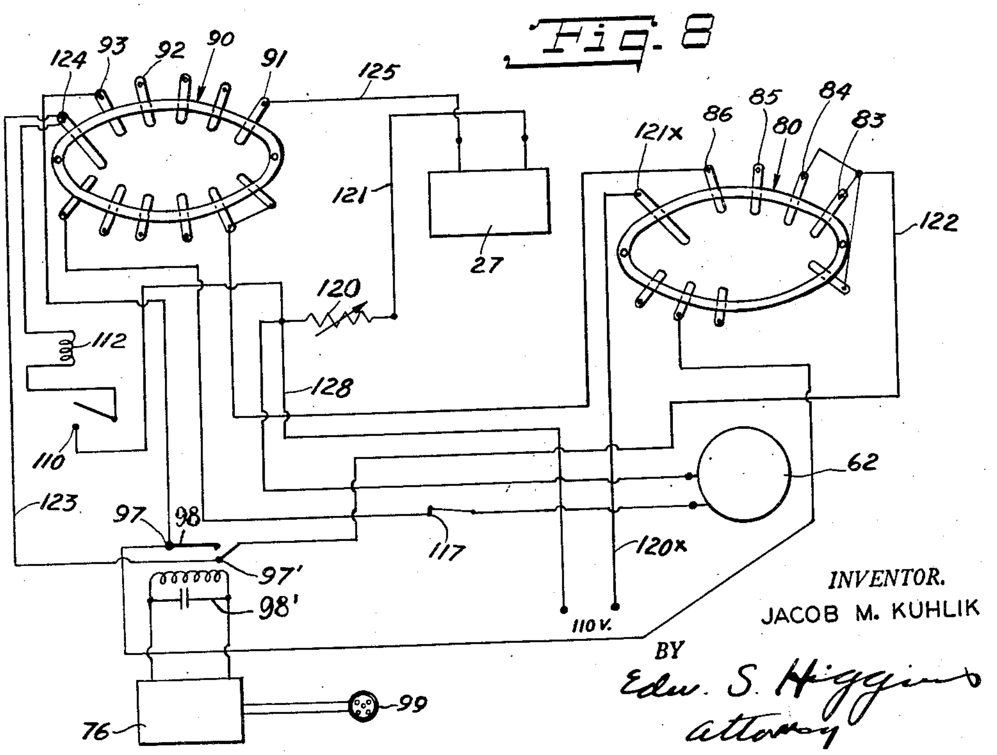
Fig. 8 is a diagrammatic view showing the motor and associated circuits.

Referring to the diagram shown in Fig. 8 and assuming that the apparatus is set for recording with the movable contact 87 of switch 80 in contact with stationary contact 83, it will be seen that the current is led by line $120^x$ to the contact or wiper $121^x$, contact 83, conductor 122, relay device 97, conductor 123, contact or wiper 124 of switch 90, contact 91, conductor 125, motor 27, conductor 121, rheostat 120, conductor 128 to ground.

A master switch indicated at 129 is provided for controlling the connection to the house supply.

In recording, the stylus 40 is pressed on the record by the weight of the stylus head and a counterweight 130 carried by said head and is urged downwardly on to the record by a spring 131 having one end fixed to actuating shaft 88 and its other end fixed to the stylus head.

To condition the stylus for "play back" or reproducing, the shaft 88 is turned by knob 89 until the knob points to "P" which turning will lift the stylus head and stylus slightly by means of a chain 132 having one end fixed to said shaft and its other end fixed to the stylus head. This takes the pressure off of the stylus but permits it to engage the side walls of the cut groove for reproducing.

When the shaft is turned to neutral position and the knob points to "N," the stylus head 41 and stylus 40 are lifted off of the record completely by means of chain 132. At the same time, the friction wheel 37 is moved away from drive wheel 33 by means of a chain 133 having one end fixed to the shaft 88 and a portion thereof fixed to shaft 34 mounting arm 35 which carries wheel 37. Simultaneously with the movement of the stylus head and friction wheel, the switch members 110 and 117 are also moved upwardly away from their respective reels by chain 133 and a chain 134, respectively, against the action of springs 135 and 136, respectively, each of which springs has one end fixed to wall 19 and its other end to a stud on shaft 111. Also at the same time, the rewind motor 62 is lifted bodily so that its shaft 65 is moved away from friction wheel 64 by means of a chain 137 which has one end fixed to the motor and its other end fixed to a stud on shaft 88. The motor is thus moved against the action of a spring 138 having one end fixed to a stud 60 on wall 19 and its other end fixed to the motor.

Changes in details might be resorted to and parts may be used without other parts without departing from the spirit or principle of the invention.

I claim:

In a sound recording and reproducing apparatus, the combination of a traveling strip of film, a stylus, a supporting head for the stylus having a sleeve member, a support for said head and sleeve comprising a transverse screw-threaded shaft slidably and rotatably mounted to position said stylus at a plurality of different transverse positions relative to the path of movement of said strip of film, a bearing plate having an opening for receiving said shaft and a recess communicating with said opening and extending to the exterior of the plate, means for actuating said shaft including a handle on the outer end thereof, a spring-pressed pin in said recess and having one end projecting into the opening in the plate and in operative engagement with the threads on said shaft whereby upon manipulation of said handle said shaft will move longitudinally, and mechanism for conditioning the stylus for reproducing the recorded matter including a shaft, a handle for moving said shaft, and a chain having one end fixed to the shaft and its other end fixed to the stylus head whereby upon turning of the shaft the stylus head and stylus are lifted to relieve the pressure upon the strip of film.

JACOB M. KUHLIK.

REFERENCES CITED

The following references are of record in the file of this patent:

UNITED STATES PATENTS

| Number | Name | Date |
|---|---|---|
| 1,454,157 | Egerton | May 8, 1923 |
| 1,642,681 | Kaplan | Sept. 20, 1927 |
| 1,971,028 | Bothe | Aug. 21, 1934 |
| 1,973,081 | Keiser | Sept. 11, 1934 |
| 2,004,893 | Hall | June 11, 1935 |
| 2,066,041 | Kiel | Dec. 29, 1936 |
| 2,082,303 | Schiller | June 1, 1937 |
| 2,087,135 | Wielage | July 13, 1937 |
| 2,096,445 | Begun | Oct. 19, 1937 |
| 2,261,420 | Shevely et al. | Nov. 4, 1941 |
| 2,289,555 | Simons | July 14, 1942 |
| 2,335,277 | Heller | Nov. 30, 1943 |
| 2,364,556 | Somers | Dec. 5, 1944 |
| 2,391,897 | Harrington | Jan. 1, 1946 |
| 2,411,501 | Brubaker | Nov. 26, 1946 |

FOREIGN PATENTS

| Number | Country | Date |
|---|---|---|
| 236,573 | Great Britain | Oct. 1, 1925 |